May 30, 1967 R. SIGNER 3,322,337
PROCESS AND DEVICE FOR SEPARATING MIXTURES
Filed Sept. 21, 1965 7 Sheets-Sheet 2

INVENTOR
Rudolf Signer

BY Wenderoth, Lind and Ponack

ATTORNEYS

INVENTOR
Rudolf Signer

May 30, 1967 R. SIGNER 3,322,337
PROCESS AND DEVICE FOR SEPARATING MIXTURES
Filed Sept. 21, 1965 7 Sheets-Sheet 5

INVENTOR
Rudolf Signer

BY *Wenderoth, Lind and Ponack*

ATTORNEYS

May 30, 1967   R. SIGNER   3,322,337
PROCESS AND DEVICE FOR SEPARATING MIXTURES
Filed Sept. 21, 1965   7 Sheets-Sheet 7

INVENTOR,
Rudolf Signer
BY Wenderoth, Lind and Ponack
ATTORNEYS

United States Patent Office 3,322,337
Patented May 30, 1967

3,322,337
PROCESS AND DEVICE FOR SEPARATING MIXTURES
Rudolf Signer, Gumligen, near Bern, Switzerland, assignor to Ciba Limited, Basel, Switzerland, a Swiss company
Filed Sept. 21, 1965, Ser. No. 489,015
Claims priority, application Switzerland, Sept. 25, 1964, 12,504/64
16 Claims. (Cl. 233—18)

This invention relates to a process and device for separating mixtures by multiple distribution between two immiscible liquids.

The separation of mixtures by multiple distribution between immiscible liquids is already being done both in the laboratory and on an industrial scale by means of a variety of different kinds of apparatus. In most of these processes the immiscible liquids are temporarily emulsified with each other in order to establish equilibrium distribution rapidly, and then the mixture is allowed to stand for a time, whereupon the immiscible liquids are again agitated together and the cycle repeated as before. Thus the cycle comprises emulsifying, settling and transportation.

It has also been proposed that the immiscible liquids should be allowed to flow in counter current through horizontal cylindrical vessels which are divided up into a series of chambers by transverse walls parallel to each other. The transverse walls have openings of suitable size at the heights of the two liquid layers to the effect that both the light and the heavy liquid in each chamber communicate with the corresponding liquid in the neighbouring chamber, or neighbouring chambers, whereby each end chamber of the apparatus has of course only a single neighbouring chamber, whereas each chamber in the interior of the apparatus has two neighbouring chambers. The end chambers have inlet and outlet pipes for the two liquids. In each chamber the two liquids are moved in such a way that their phase interface remains in the form of a coherent surface, that is to say there is no emulsifying of one liquid into the other although there is a continuous renewal of the volume of each liquid coming into contact with the other liquid, with the result that the equilibrium distribution of a substance soluble in the two liquids is rapidly established.

An apparatus of this kind is simple to construct but in application has the following two limitations:

In the first place, the openings in the transverse wall must be adjusted to suit the viscosities and flow velocities of the two liquids. If the opening is too big the bodies of liquid in neighbouring chambers mix together through the opening, and this reduces the sharpness of the separation obtained. On the other hand, if the opening is too small the separation is sharp but the flow velocity must be kept small to allow for the build-up of liquid from chamber to chamber, and consequently the throughput of the apparatus is low. In the second place, the number of chambers has an upper limit which is in practice quite low. The device of this sort used up to now have only 10 to 20 chambers, or at most about 40. This limit in the maximal number of chambers is due to the build-up of liquid from chamber to chamber.

According to the invention there is provided a process for separating the components of a mixture by repeated distribution of the mixture between two immiscible liquids of different densities, in a series of interconnected chambers comprising feeding the denser of the two liquids into the first chamber in said series until said denser liquid overflows from the last chamber in said series, feeding the lighter of the two liquids into the first chamber until said lighter liquid overflows from the last chamber in order to displace a part of the denser liquid in each chamber, introducing the mixture into the first chamber, feeding a further quantity of lighter liquid into the first chamber and collecting fractions of liquid overflowing from the last chamber, a coherent interface being maintained between the two liquids in each chamber so that the two liquids do not emulsify.

The invention also provides an apparatus for separating the components of a mixture by repeated distribution of the mixture between two immiscible liquids comprising a tube adjustably inclinable to the horizontal and rotatable about its longitudinal axis, an end plate at each end of the tube, a plurality of walls transversely positioned in said tube and subdividing said tube into a plurality of chambers, each transverse wall having an opening formed therein spaced from the longitudinal axis of the tube and the openings in adjacent walls being angularly displaced relative to each other, an inlet pipe for introducing liquid into the upper chamber, and an outlet pipe for removing liquid from the lower chamber.

The number of chambers may be practically unlimited and can easily be several hundred or even thousands, whereby separation is obtained of a sharpness compared to that provided by liquid or gas chromatographic columns.

The operating conditions are extremely simple. All that is necessary is to move the liquid through each chamber intensively enough to cause a rapid renewal of the two liquids near the interface, but without causing emulsification, whereby however the flow velocity of the lighter phase must be low enough to ensure that distribution equilibrium is obtained in each chamber to the degree desired. It is entirely unnecessary to adjust the dimensions of the overflow openings to suit the viscosity and the flow velocity of the lighter liquid.

The invention will now be describer in greater detail with reference to the accompanying drawings, in which.

Figure 1:
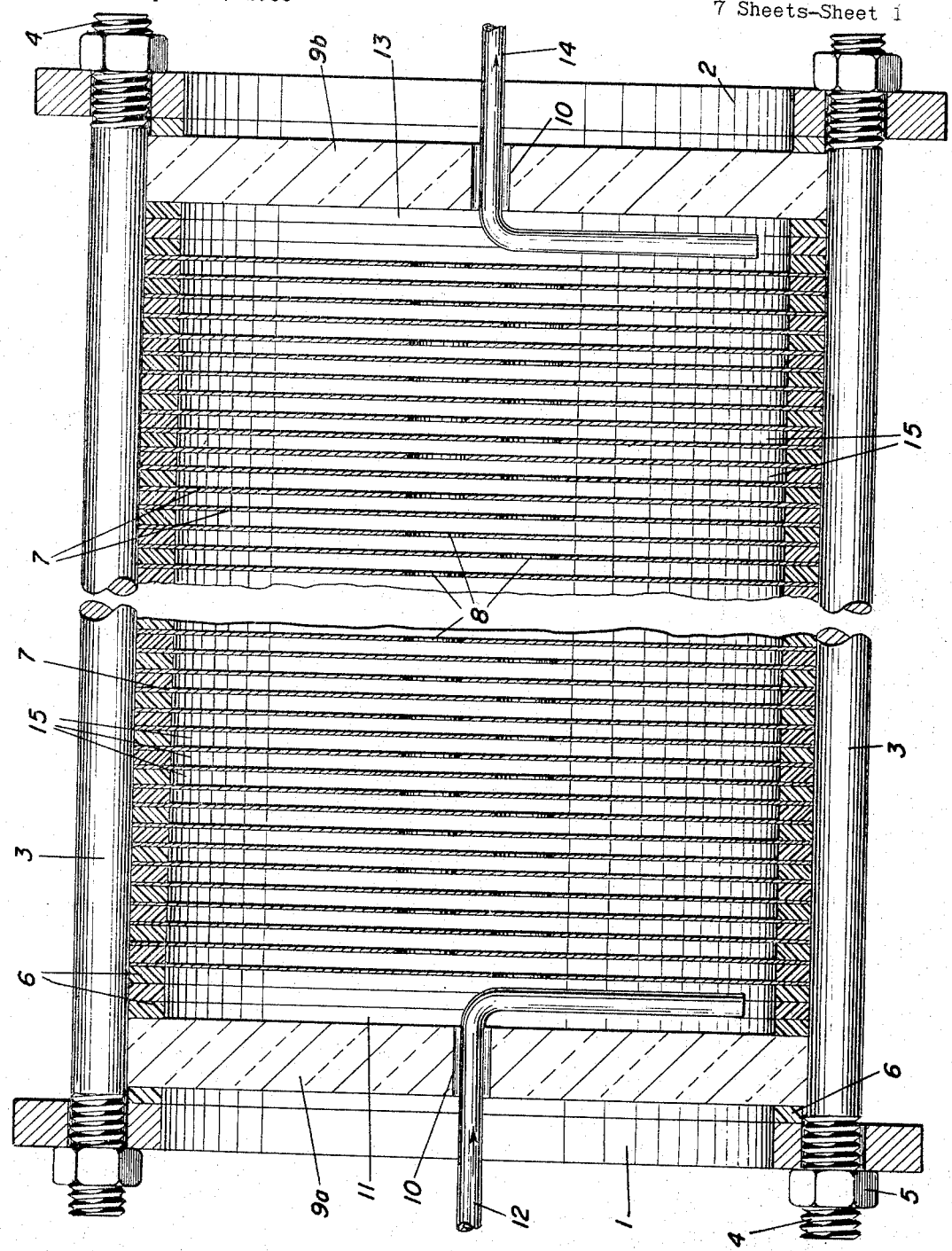
FIGURE 1 is an axial section through a preferred chamber assembly.

The cylindrical assembly of chambers shown in FIGURE 1 consists of two metal end rings 1 and 2, which elements of the chamber are rings 6 made of a chemiber elements between them, by the metal tie-rods 3 which have threaded ends 4 to take the nuts 5. The structural elements of the chamber are rings 6 made of a schemically inert synthetic resin such as polyethylene or Teflon, enclosing between them plates 7, preferably made of stainless steel, each plate having an eccentric circular opening 8. The chamber assembly is closed at its ends by massive plates 9a, 9b made of glass or of a transparent plastic or the like, each end plate having a concentric opening 10. If plates 9a, 9b are made of glass, a ring of synthetic plastic is inserted between plate 9a and the metal ring 1 and between plate 9b and metal ring 2, to prevent the glass plates from cracking when the nuts 5 are tightened to make the chamber assembly fluid-tight. The use of glass for the plates 9a, 9b has the advantage that it allows the liquid level in the end chambers to be observed continuously while the device is being used. Liquid is fed into the upper end chamber 11 through the feed tube 12 and from the lower end chamber 13 the effluent liquid is removed through the outlet tube 14. The end chambers 11 and 13 have greater depth than the middle chambers 15 in order to allow sufficient room for the inlet and outlet tubes 12 and 14, which do not rotate. The greater depth of the end chambers is preferably provided by using several synthetic plastic rings 6.

Figure 2:
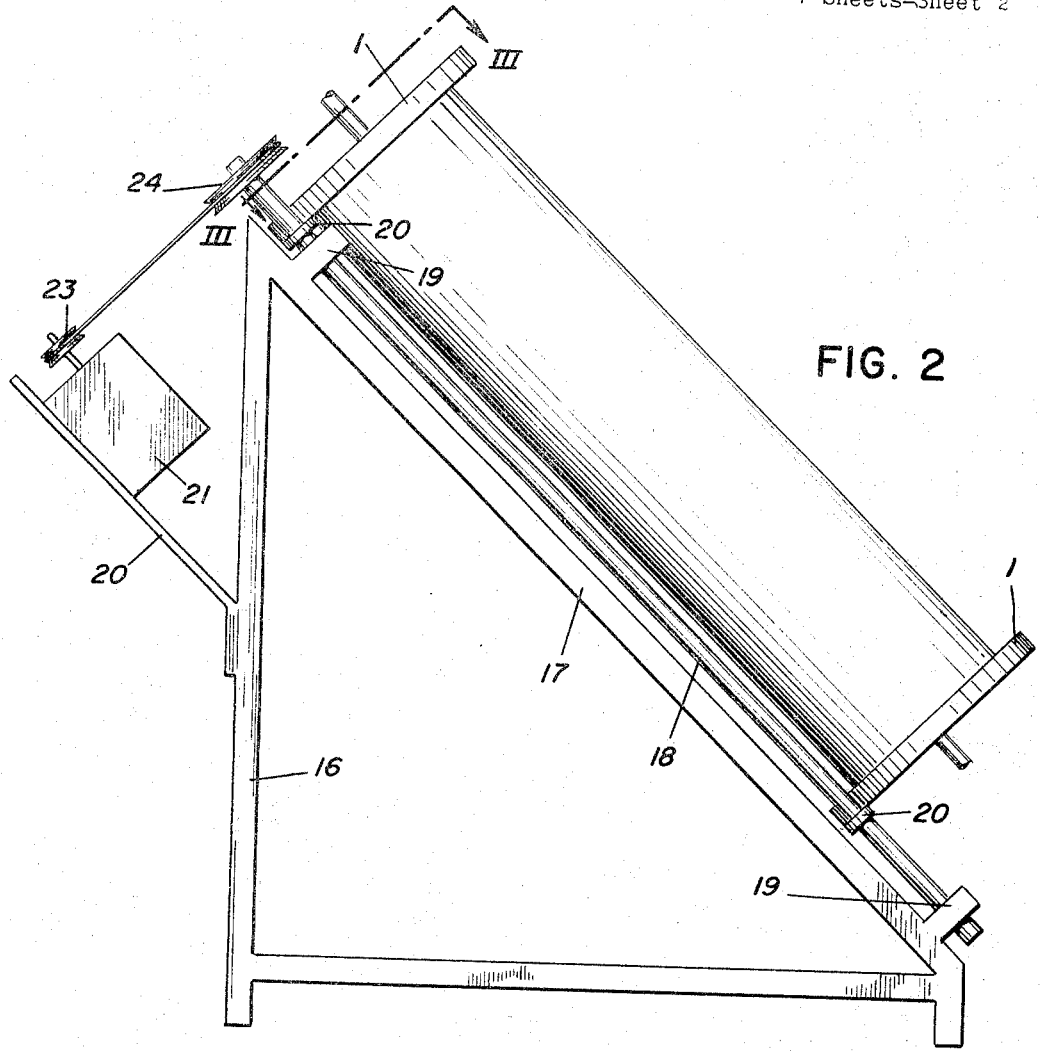
FIGURE 2 is a side view through a preferred embodiment of the apparatus according to the invention.
Figure 3:
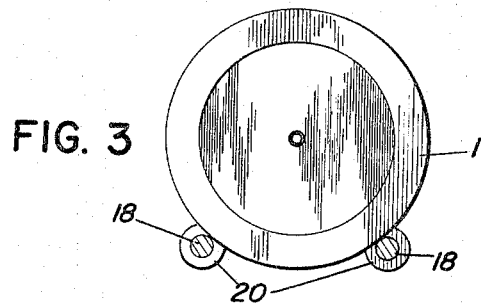
FIGURE 3 is a section along the line III—III of FIGURE 2.

FIGURE 2 is a side view of a preferred arrangement for mounting and driving the chamber assembly and FIGURE 3 is a section along the line III—III of FIGURE 2. On a frame 16, whose upper beam 17 is inclined at 45° to the horizontal, are mounted two parallel rollers 18, supported by the bearings 19. The chamber assembly shown in FIGURE 1 rests with its two metal rings 1, 2 on the rollers 18 and four thrust rings 20, two for each roller 18, engage the metal rings and prevent the chamber assembly from sliding downwards on the rollers 18. One of the two rollers is fitted with a V-belt pulley 24 and the roller is driven by a motor 21, via a V-belt between pulley 24 and motor pulley 23. The motor 21 is attached to the frame 16 by an arm 22.

In another embodiment, not shown in the drawings, the chamber has flanged ends whose outer edges rest on two rollers made preferably of a resilient material, whereby the lower shoulder of the upper flange is preferably supported near its outer edge by a roller driven by a motor.

The inclination of the chamber assembly to the horizontal is preferably adjustable, but is usually at an angle of about 45°. If the slope is only 10 to 20° and the plates 7 are spaced apart by gaps of 3–5 mm., the difference in height between the menisci of the light liquid in neighboring chambers is so small that when the chamber assembly rotates the liquids in neighboring chambers mix together through the openings 8, and this reduces the sharpness of the separation. On the other hand, if the slope is between 35 and 55° and the plate spacing is 3 to 5 mm. the differences in height between the liquid menisci in neighboring chambers is enough to practically eliminate any undesired mixing and the lighter liquid moves from one chamber into the next. Finally, if the slope of the chamber assembly to the horizontal is greater than 55° no further improvement in preventing undesired lateral mixing of the light liquid between neighbouring chambers is obtained, the volume of the two liquids in each chamber is less than the volume in each chamber when the assembly is at an angle between 35 and 55° and moreover the mounting of the chamber assembly and its drive becomes more complicated. Thus the optimal inclination is somewhere between 35 and 55°.

In order to obtain good sharpness of separation the distance between two neighbouring plates 7, that is to say the depth of each chamber, should be as small as possible, and in this way one obtains a large number of chambers in a chamber assembly of a given length. In an apparatus in which the internal diameter of the rings 6 is 8 to 15 cm. it has been found that a chamber depth of 2 mm. is the lower limit. If the chamber depth is very small a clean interface between the two liquids in each chamber can be obtained only if the chamber assembly is rotated very slowly. On the other hand, if the rotation is very slow the equilibrium distributing between the two liquids takes a long time to become established with the result that the throughput of the apparatus is low. With a chamber depth of 3 mm. a clean interface is obtained even during rapid rotation of the apparatus, when using liquids such as are normally used for this type of separation. In the case of a chamber assembly of large diameter, for example of the order of 1 metre, the chamber depth is preferably increased to about double that for a chamber assembly having a diameter of from 8 to 15 cm.

Figure 4:
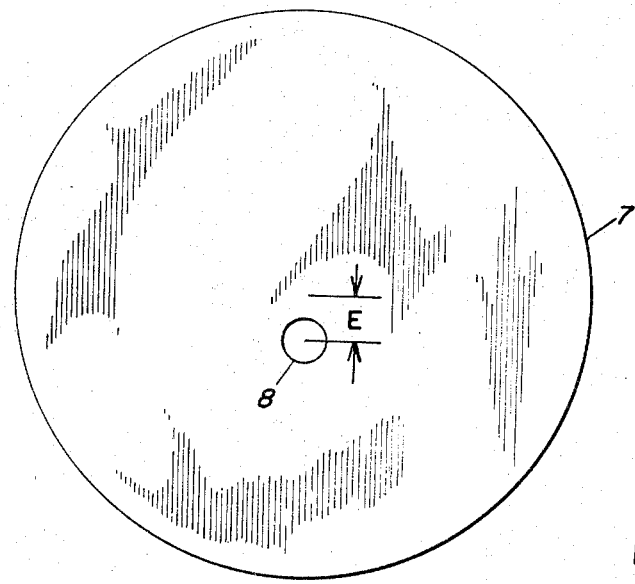
FIGURE 4 is a plan view of a separating wall showing the opening.

The arrangement of the openings 8 in the circular plates 7 exerts a great influence on the separation obtained. In order to prevent mixing of the light liquids in neighbouring chambers it is advisable to position the openings 8 somewhat eccentrically, as shown in FIGURE 4. In what follows the distance E in FIGURE 4 will be taken as the eccentricity of the openings in the plates. The openings in successive plates are preferably displaced relatively to each other in a systematic manner. This displacement can be 180° as shown in FIGURE 1, but good results are also obtained with displacements of 120° or 90°. The displacement of the openings has the result that during rotation of the chamber assembly, for at least part of the time that liquid flows into a particular chamber no liquid will flow out of the chamber. If the displacement is 180° liquid flows out of the chamber after liquid has stopped flowing in and if the displacement is 120° liquid starts flowing out of the chamber after two thirds of the time that liquid flows into the chamber has elapsed.

The procedure for separating a mixture into its several components will now be described with reference to FIGURES 5 and 6. The heavier liquid is first fed into the rotating chamber assembly via the vertical tube 25 from a conveying device such as a pump, a Mariotte bottle or the like (not shown). The liquid flows through the tube 26, which is connected to the tube 12 by the tube 27, and so reaches the upper chamber of the assembly of chambers. The parts 25, 26 and 12 are attached to the frame 16 (FIGURE 2). As soon as the first chamber is filled up to the height of the opening 8, the liquid flows into the second chamber. As soon as the level in the second chamber reaches the overflow opening the liquid flows into the third chamber, and so on. From the last chamber the liquid passes through overflow tube 28 into a container, (not shown). The overflow tube 28 is connected to the outlet tube 14 by the tube 29 and the tubes 14 and 28 are attached to the frame 16. The height of the liquid meniscus in the last chamber is determined by the height of the junction between the tube 28 and the vertical tube 30.

After the chamber assembly has been filled with the heavier liquid, light liquid is introduced through the tube 25 into the first chamber and passes from there into all the subsequent chambers, the light liquid displacing some heavy liquid in each chamber. During continuous introduction of the light liquid into the first chamber there issues from the last chamber at first only heavy liquid and then, for a short period, both heavy and light liquids, and finally only the light liquid. The total volume of heavy liquid displaced corresponds to the layer of lighter liquid in all the chambers. After all the chambers have been filled with the two liquids in this way, the mixture of substances, dissolved in either the heavier or lighter liquid, is introduced into the first chamber. However before doing this sufficient liquid is withdrawn from the tube 25 to empty the first chamber, until only the lowest end of the tube 12 dips into a residue of liquid. The dissolved mixture is then introduced into the tube 25, and some of it flows through the tubes 26 and 12 into the first chamber.

In order to effect the separation light liquid is continuously introduced into the tube 25 and fractions are collected at the lower end of the tube 30 preferably by using a fraction collector.

The speed of rotation of the chamber assembly is so chosen that the two liquids do not emulsify. Whether or not emulsification is taking place can be observed through the glass plates at each end of the chamber assembly. The permissible rate of rotation depends on the dimensions of the chambers, on the nature of the liquids and on the components in the mixture, and must be determined empirically for each system.

Figure 7:
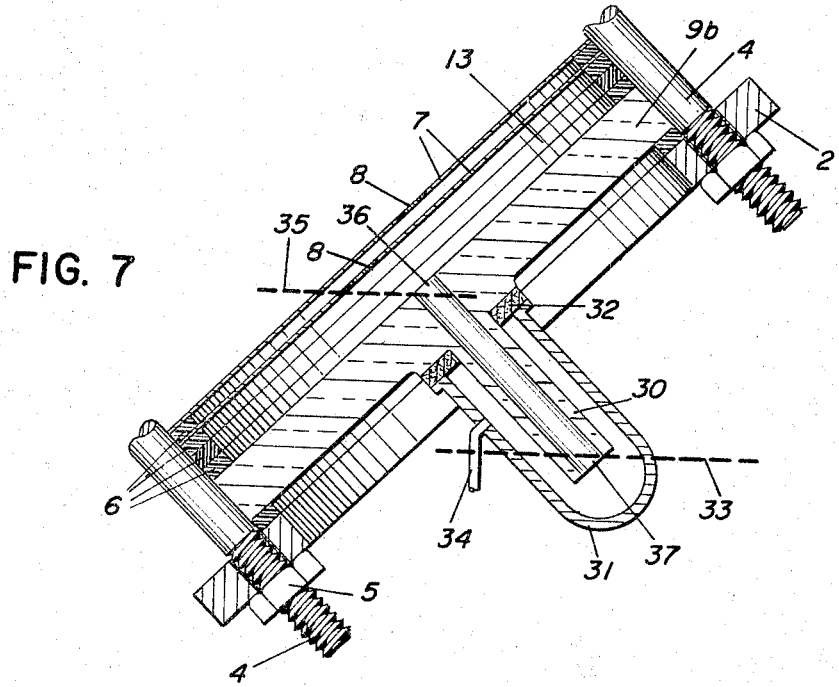
FIGURE 7 is an axial section through the lower part of a chamber assembly, showing another type of outlet system.

In certain cases it is necessary to make the chamber assembly as gas-tight as possible in order to prevent evaporation particularly of the heavier liquid. For this purpose the apparatus can be equipped with a gas barrier at the inlet and outlet. A preferred type of gas barrier is that shown in FIGURE 7 which illustrates a siphonic gas barrier mounted at the outlet of the chamber assembly. The outlet in this case consists of a length of pipe 30 projecting centrally from the lower end plate 9b. The pipe 30 is attached rigidly to the plate 9b or can if desired be formed as an integral part of said plate. The extension pipe 30 projects concentrically into a cylindrical pot 31 which rests with its upper rim against the end plate 9b with the interposition of a sealing ring 32 as shown in the figure, or rests against a sealing surface on the plate. An outlet connection 34 is situated above the level 33 of the lower end 37 of the pipe 30. When the opening 8 of the lowest intermediate plate 7 is at its lowest position, as shown in the drawing, the height of said opening is at about the same level 35 as that of the upper end 36 of the pipe 30.

Figure 5:
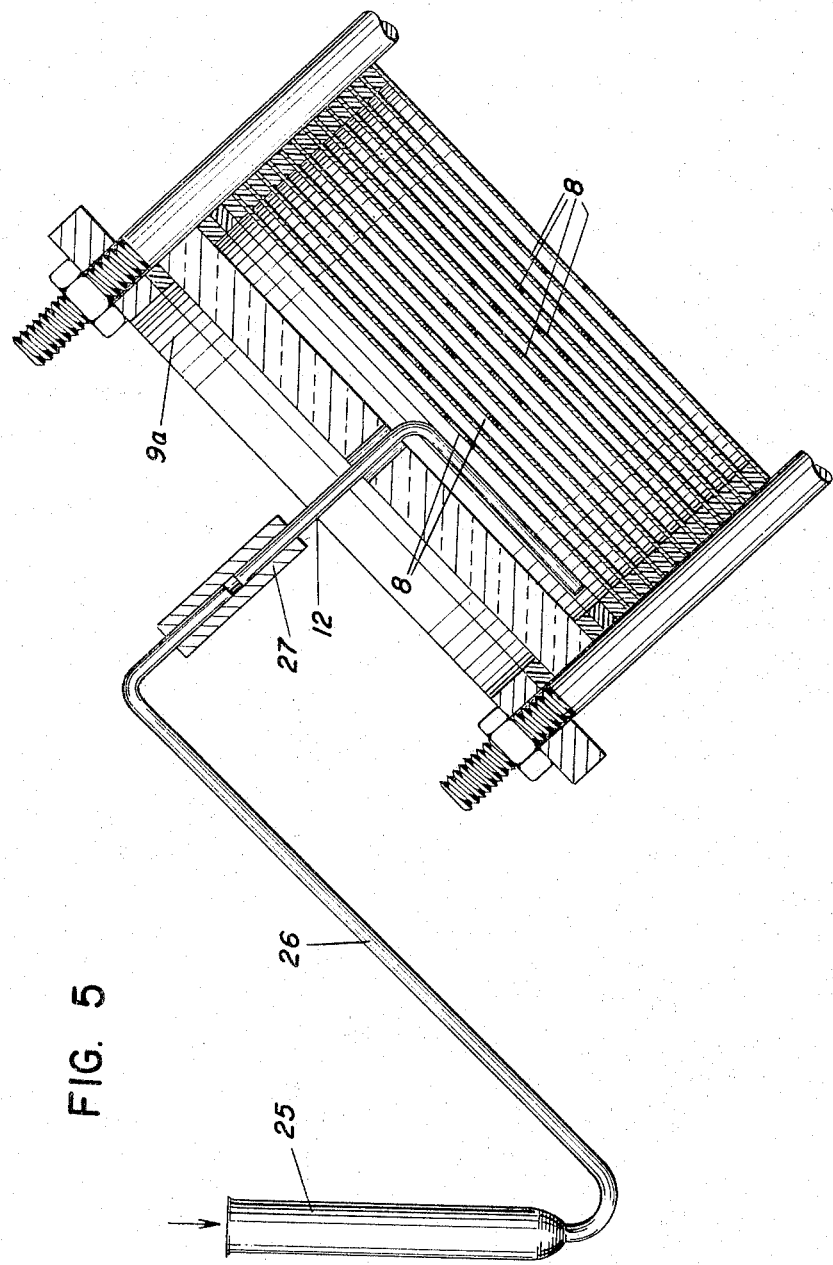
FIGURE 5 is an axial section through the upper part of a chamber assembly, showing one type of inlet system.
Figure 6:
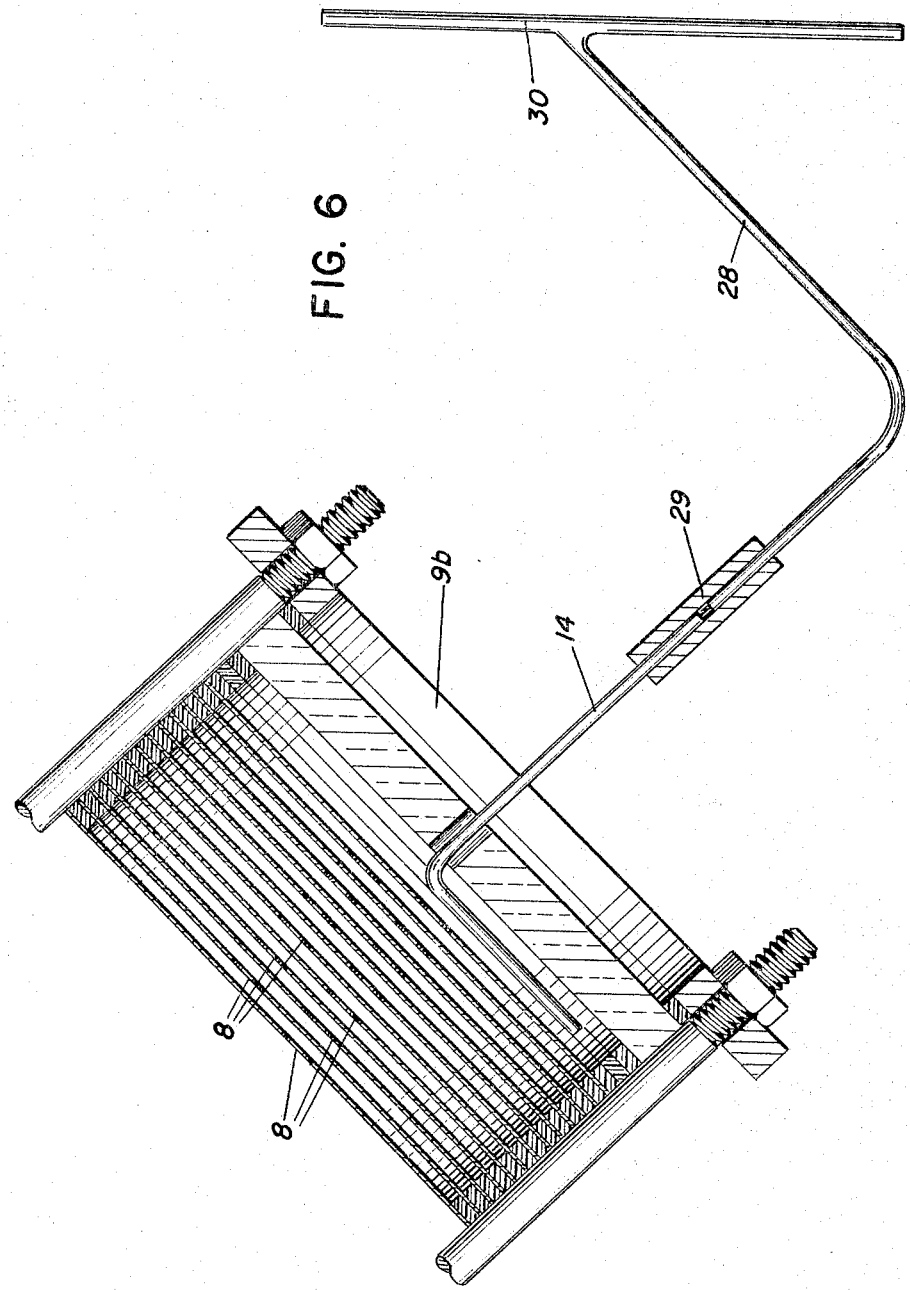
FIGURE 6 is an axial section through the lower part of a chamber assembly showing one type of outlet system.

In the embodiment shown in FIGURES 1, 5 and 6 it is often possible to obtain a sufficient gas-tightness merely by leading the tubes 12 and 14 through suitable gas tight seals in the plates 9a and 9b which allow for rotation of the chamber assembly about the tubes 12 and 14.

During this separation process the components in the mixture are conveyed through the assembly of chambers at different velocities depending on their distribution coefficients, and in this respect the process is similar to gas chromatography or chromatographic distribution columns. If the number of chambers is great enough and if the distribution coefficients of the individual components are different enough, all the components may be recovered one after the other in substantially pure form. Each component shows the typical and calculatable curve for concentration as a function of the volume of light liquid flowing out of the apparatus. This is the well-known bell-shaped curve.

If the light liquid is flowing very slowly the equilibrium distribution of each component is established in each chamber practically completely and the final sharpness of separation reaches the upper theoretically possible limit. However to obtain this the duration of the operation must be very great. If the flow velocity of light liquid is increased equilibrium distribution is not obtained completely in the chambers and the sharpness of the separation decreases. Under these circumstances the sharpness of separation obtained corresponds to what would be obtained using an apparatus with few chambers in which equilibrium distribution is complete. The number of theoretically effective chambers can be calculated for each component from the three values of the bell-shaped curve, on the basis of generally recognised theories for gas or distribution chromatography. These values are $V_{max}$, which is the total volume of effluent recovered at the instant when the maximal concentration on the bell-shaped curve is reached, $C_{max}$, which is the concentration of the components at the maximum of the bell-shaped curve, and S, which is the quantity of the component corresponding to the area of the bell-shaped curve. The number "$n$" of theoretically effective chambers is calculated from the equation:

$$n = 2\pi \left( \frac{V_{max.} \cdot C_{max.}}{S} \right)^2 + 1$$

The following examples illustrate the invention.

EXAMPLE 1

Apparatus

Inclination to the horizontal—45°
Diameter of chamber—70 mm.
Depth of chamber—2 mm.
Diameter of circular opening in plate—6 mm.
Eccentricity of opening—6 mm.
Number of chambers—81
Volume of both liquids in the entire apparatus—300 ml.

Liquids

Light liquid—n butanol saturated with water
Heavy liquid—water saturated with n butanol

Mixture

Glutaric acid—700 mg.
Malonic acid—700 mg.

Operating conditions

Speed of rotation—27 rev./min.
Rate of flow of light liquid—1.8 ml./hr.
Volume ratio—0.3

Figure 8:
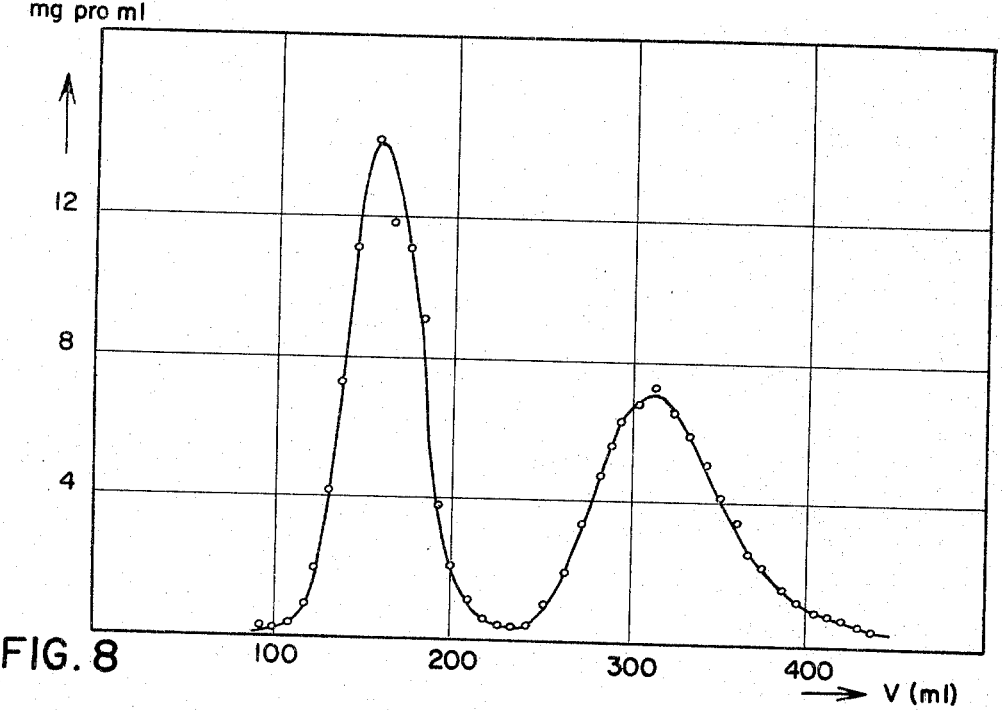
FIGURES 8 to 11 are graphs illustrating the separation achieved with the apparatus of FIGURES 1 to 5.

Separation (according to FIGURE 8)

Glutaric acid:
  $S_g$ (quantity in all fraction)—693 mg.
  $C_{max}$—14.1 mg./ml.
  $V_{max}$—165 ml.
  $n$—72±3
Malonic acid:
  S (quantity in all fractions)—651 mg.
  $C_{max}$—7.3 mg./ml.
  $V_{max}$—314 ml.
  $n$—78±3

EXAMPLE 2

*Apparatus.*—As in Example 1.
*Liquids.*—As in Example 1.
*Mixture.*—As in Example 1.

Operating conditions

Speed of rotation—As in Example 1
Rate of flow of light liquid—3.2 ml./hr.
Volume ratio—0.3

Separation (according to FIGURE 8)

Glutaric acid:
  S (quantity in all fraction)—693 mg.
  $C_{max}$—13.7 mg.—ml.
  $V_{max}$—165 ml.
  $n$—68±3
Malonic acid:
  S (quantity in all fractions)—681 mg.
  $C_{max}$—6.65 mg./ml.
  $V_{max}$—325 ml.
  $n$—64±3

EXAMPLE 3

*Apparatus.*—As in Example 1.
*Liquids.*—As in Example 1.

Mixture

Glutaric acid—720 mg.
Malonic acid—720 mg.

Operating conditions

Speed of rotation—As in Example 1
Rate of flow of light liquid—13.8 ml./hr.
Volume ratio—0.3

Figure 9:
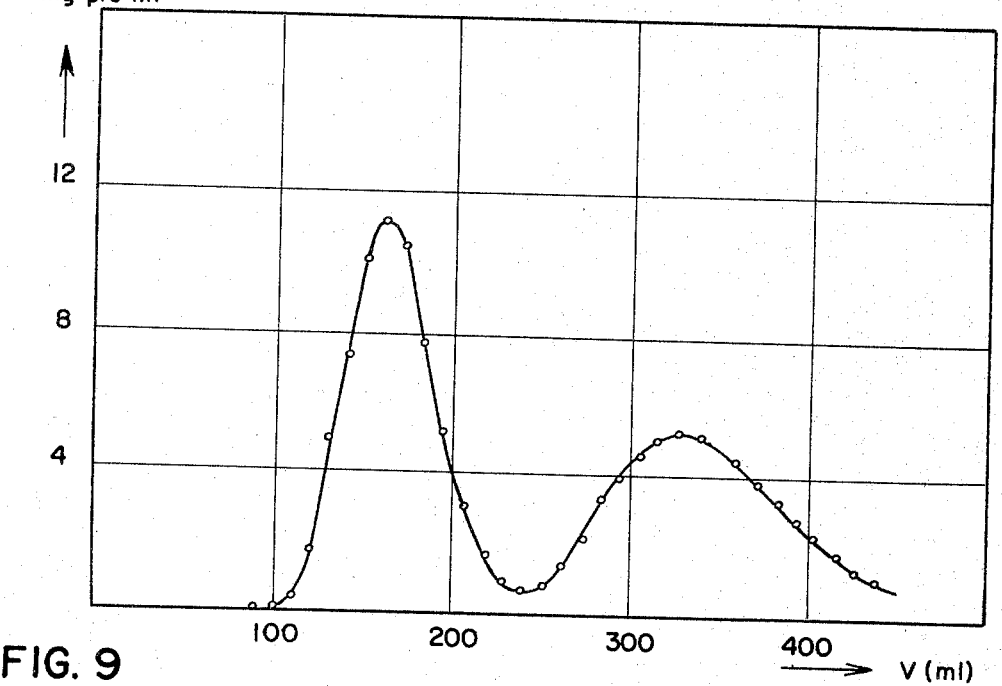

Separation (according to FIGURE 9)

Glutaric acid:
  S (quantity in all fractions)—709 mg.
  $C_{max}$—11.4 mg./ml.
  $V_{max}$—168 ml.
  $n$—47±4
Malonic acid:
  S (quantity in all fractions)—686 mg.
  $C_{max}$—5.2 mg./ml.
  $V_{max}$—334 ml.
  $n$—41±4

EXAMPLE 4

*Apparatus.*—As in Example 1.

Liquids

Light—19 volumes of methanol and 1 volume of water, saturated with petroleum ether, with a boiling range of 50 to 70° C.

Heavy—Petroleum ether with a boiling range of 50 to 70° C., saturated with methanol-water mixture in volume ratio 19:1.

*Mixture.*—Extract from 50 g. of fresh stinging nettle leaves.

Operating conditions

Speed of rotation—13 rev./min.
Rate of flow of light liquid—4.7 ml./hr.
Volume ratio—0.43
Collection of fractions—Fraction changed every 2 hours, i.e. fractions of 9.4 ml. each.

Figure 10:
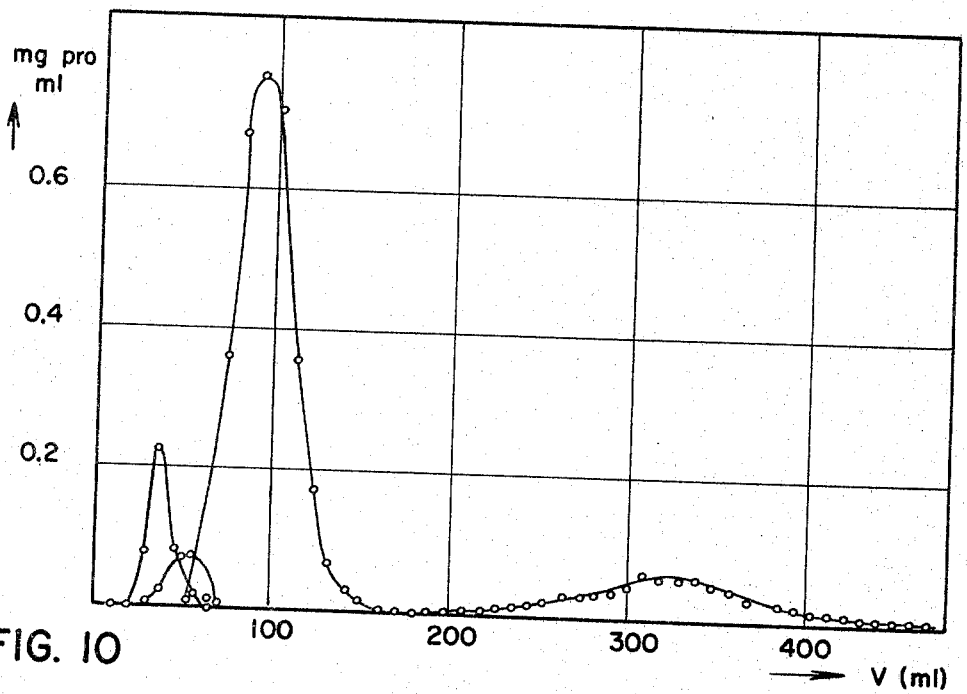

Separation according to FIGURE 10

Carotin:
- S (quantity in all fractions)—3.87 mg.
- $C_{max}$—0.228 mg./ml.
- $V_{max}$—37.6 ml.
- $n$—32±3

Phacophytin:
- S (quantity in all fractions)—1.80 mg.
- $C_{max}$—0.083 mg.
- $V_{max}$—47 ml.
- $n$—31±3

Chlorophyll a:
- S (quantity in all fractions)—30.7 mg.
- $C_{max}$—0.76 mg./ml.
- $V_{max}$—94 ml.
- $n$—35±3

Chlorophyll b:
- S (quantity in all fractions)—6.3 mg.
- $C_{max}$—0.055 mg./ml.
- $V_{max}$—310 ml.
- $n$—46±4

EXAMPLE 5

Apparatus

Inclination to the horizontal—45°
Diameter of chamber—100 mm.
Depth of chamber—3 mm.
Diameter of circular opening in plate—8 mm.
Eccentricity of opening—8 mm.
Number of chambers—199
Volume of both liquids in the entire apparatus—1850 ml.

Liquids

Light—n-Butanol saturated with water
Heavy—Water saturated with n-butanol

Mixtures

Glutaric acid—1.50 g.
Malonic acid—1.50 g.

Operating conditions

Speed of rotation—20 rev./min.
Rate of flow of light liquid—40 ml./hr.
Volume ratio—0.33

Figure 11:
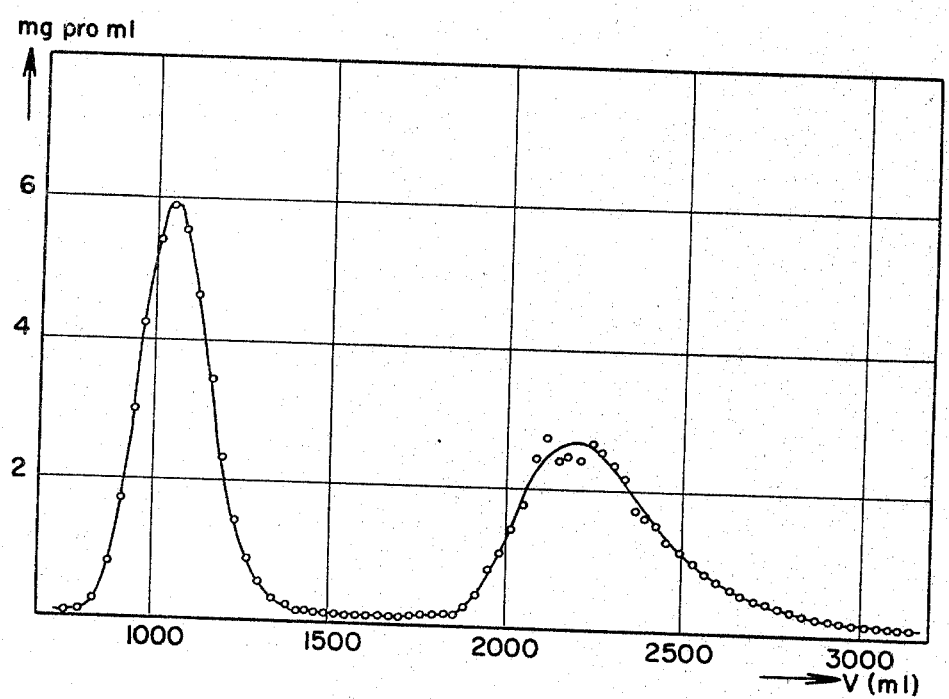

Separation (according to FIGURE 11)

Glutaric acid:
- S (quantity in all fractions)—1.49 g.
- $C_{max}$—5.90 mg./ml.
- $V_{max}$—1070 ml.
- $n$—133±5

Malonic acid:
- S (quantity in all fractions)—1.38 g.
- $C_{max}$—2.64 mg./ml.
- $V_{max}$—2180 ml.
- $n$—110±5

What is claimed is:

1. A process for separating the components of a mixture by repeated distribution of the mixture between two immiscible liquids of different densities in a series of interconnected chambers comprising
feeding the denser of the two liquids into the first chamber in said series until said denser liquid overflows from the last chamber in said series, feeding the lighter of the two liquids into the first chamber until said lighter liquid overflows from the last chamber in order to displace a part of the denser liquid in each chamber, introducing the mixture into the first chamber, feeding a further quantity of lighter liquid into the first chamber and collecting fractions of liquid overflowing from the last chamber while maintaining a coherent interface between the two liquids in each chamber so that the two liquids do not emulsify.

2. Apparatus for separating the components of a mixture by repeated distribution of the mixture between two immiscible liquids comprising
a tube inclined to the horizontal means for rotating said tube about its longitudinal axis, an end plate at each end of said tube, a plurality of walls transversely positioned in said tube and thereby subdividing said tube into a plurality of chambers including an upper chamber and a lower chamber, an inlet pipe for introducing liquid into said upper chamber, an outlet pipe for removing liquid from said lower chamber and portions of each transverse wall defining an opening therein, said opening being spaced from the longitudinal axis of the tube and the openings in adjacent walls being angularly displaced relative to each other.

3. Apparatus for separating the components of a mixture by repeated distribution of the mixture between two immiscible liquids comprising
a plurality of rings fitted together in fluid-tight relationship to form a tube, means for supporting said tube at an angle to the horizontal and for rotating said tube about its longitudinal axis, a plurality of discs transversely positioned in said tube and forming a fluid-tight seal between the edges thereof and the rings thereby subdividing the tube into a plurality of chambers, an end plate fixed at each end of the tube and forming an upper and a lower chamber, an inlet pipe for introducing liquid into said upper chamber, an outlet pipe for removing liquid from said lower chamber and portions of each disc defining an opening therein said opening being spaced from the longitudinal axis of the tube and the openings in adjacent discs being angularly displaced relative to each other.

4. Apparatus according to claim 3, wherein the discs are of stainless steel.

5. Apparatus according to claim 3, wherein the rings are of a chemically inert synthetic resin.

6. Apparatus according to claim 3, wherein the tube is inclined to the horizontal at an angle of about 45°.

7. Apparatus for separating the components of a mixture by repeated distribution of the mixture between two immiscible liquids comprising
a plurality of rings formed of polyethylene and fitted together in fluid-tight relationship to form a tube, means for supporting said tube and for rotating said tube about its longitudinal axis, means for adjusting the angle between the longitudinal axis of the tube and horizontal from about 30° to 60°, a plurality of stainless steel discs transversely positioned in said tube and forming a fluid-tight seal between the edges thereof and the rings thereby subdividing the tube into a plurality of chambers, an end plate fixed at each end of the tube and forming an upper and lower chamber, an inlet pipe for introducing liquid into said upper chamber an outlet pipe for removing liquid from said lower chamber and portions of each disc defining an opening therein, said opening being spaced from the longitudinal axis of the tube and the openings in adjacent discs being angularly displaced relative to each other.

8. Apparatus for separating the components of a mixture by repeated distribution of the mixture between two immiscible liquids comprising,
a plurality of rings formed of polyethylene and fitted together in fluid-tight relationship to form a tube, means for supporting said tube and for rotating said tube about its longitudinal axis, means for adjusting the angle between the longitudinal axis of the tube and horizontal from about 30° to 60°, a plurality of stainless steel discs transveresely positioned in said tube and forming a fluid-tight seal between the edges thereof and the rings thereby subdividing the tube into a plurality of chambers, an upper end plate having an aperture formed in the centre thereof and being fixed at the upper end of the tube thereby forming an upper chamber between said upper end plate and the upper disc in said tube a lower end plate having an aperture formed in the centre thereof and being fixed at the lower end of the tube thereby forming a lower chamber between said lower end plate and the lower disc in said tube, an inlet pipe for feeding liquid to said upper chamber, said inlet pipe passing through the aperture in said upper end plate such that the tube may rotate with respect to said inlet pipe, an outlet pipe for removing liquid from said lower chamber said outlet pipe passing through the aperture in said lower end plate such that the tube may rotate with respect to the outlet pipe and portions of each disc defining an opening therein, said opening being spaced from the longitudinal axis of the tube and the openings in adjacent discs being angularly displaced relative to one another.

9. Apparatus according to claim 8 including means forming a fluid-tight seal between the inlet tube and the upper end plate and means forming a fluid-tight seal between the outlet tube and the lower end plate.

10. Apparatus for separating the components of a mixture by repeated distribution of the mixture between two immiscible liquids comprising
a plurality of rings fitted together in fluid-tight relationship to form a tube, a plurality of discs transversely positioned in said tube and forming a fluid-tight seal between the edges thereof and the rings thereby subdividing the tube into a plurality of chambers, an end plate fixed at each end of the tube and forming an upper and lower chamber, a framework, two rollers mounted for rotation on said framework parallel to one another and inclined to the horizontal, means for rotating one of said rollers, a thrust ring fixed securely on each roller, flange means at each end of the tube, the tube being positioned on said rollers such that the thrust rings on the rollers engage the upper flange on the tube to prevent the tube from slipping down the rollers and such that rotation of said one roller by said rotating means causes rotation of said tube and rotation of the other roller, an inlet pipe for introducing liquid into said upper chamber, an outlet pipe for removing liquid from said lower chamber, portions of each disc defining an opening therein, said opening being spaced from the longitudinal axis of said tube and the openings in adjacent walls being angularly spaced relative to each other.

11. Apparatus according to claim 10, wherein the inlet pipe is in the form of an angled tube.

12. Apparatus according to claim 10, wherein the outlet pipe is in the form of an angled tube.

13. Apparatus according to claim 10, wherein the rollers have a resilient surface.

14. Apparatus for separating the components of a mixture by repeated distribution of the mixture between two immiscible liquids comprising
a plurality of rings formed of polyethylene and fitted together in fluid-tight relationship to form a tube, means for supporting said tube and for rotating said tube about its longitudinal axis, means for adjusting the angle between the longitudinal axis of the tube and horizontal from about 30° to 60°, a plurality of stainless steel discs transversely positioned in said tube and forming a fluid-tight seal between the edges thereof and the rings thereby subdividing the tube into a plurality of chambers, portions of each disc defining an opening therein said opening being spaced from the longitudinal axis of the tube and the openings in adjacent discs being angularly displaced relative to one another, an upper end plate fixed at the upper end of the tube thereby forming an upper chamber between said upper end plate and the upper disc in said tube, a lower end plate fixed at the lower end of the tube thereby forming a lower chamber between said lower end plate and the lower disc in said tube, an inlet pipe passing through the upper end plate for feeding liquid to said upper chamber, an outlet pipe passing through said lower end plate and rigidly fixed thereto, a pot surrounding the part of the outlet pipe extending outside said tube and forming a fluid-tight seal with the lower end plate and, an overflow pipe for removing liquid from said pot, the overflow pipe being positioned at a level above the lower end of the outlet pipe.

15. Apparatus according to claim 14, wherein the upper end of the outlet pipe is at substantially the same level as the aperture in the lowest disc in the tube when said tube is rotated such that the aperture in the lowest disc is in its lowest position.

16. Apparatus according to claim 14, including a sealing ring between the pot and the lower end plate.

References Cited

UNITED STATES PATENTS

| | | | |
|---|---|---|---|
| 2,036,924 | 4/1936 | Coutor | 233—15 |
| 2,422,882 | 6/1947 | Bramley | 233—18 X |
| 2,715,994 | 8/1955 | Steinacker | 233—18 X |
| 3,194,492 | 7/1965 | Koffinke et al. | |
| 3,255,805 | 6/1966 | Bechard | 233—22 X |

M. CARY NELSON, *Primary Examiner.*

H. KLINKSIEK, *Assistant Examiner.*